United States Patent
Polese Cossio et al.

(10) Patent No.: US 11,176,396 B2
(45) Date of Patent: Nov. 16, 2021

(54) DETECTION OF WHETHER MOBILE COMPUTING DEVICE IS POINTING TO VISUAL CODE

(71) Applicant: Hewlett-Packard Development Company, L.P., Spring, TX (US)

(72) Inventors: Lucio Polese Cossio, Porto Alegre (BR); Renato Oliveira da Silva, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 40 days.

(21) Appl. No.: 16/620,999

(22) PCT Filed: Jun. 29, 2017

(86) PCT No.: PCT/US2017/039970
§ 371 (c)(1),
(2) Date: Dec. 10, 2019

(87) PCT Pub. No.: WO2019/005066
PCT Pub. Date: Jan. 3, 2019

(65) Prior Publication Data
US 2020/0193202 A1  Jun. 18, 2020

(51) Int. Cl.
*G06K 9/18* (2006.01)
*G06T 7/73* (2017.01)
*G06K 9/46* (2006.01)

(52) U.S. Cl.
CPC ............. *G06K 9/18* (2013.01); *G06K 9/4604* (2013.01); *G06T 7/74* (2017.01)

(58) Field of Classification Search
CPC .. G06K 2209/27; G06K 9/00671; G06K 9/18; G06K 9/209; G06K 9/22; G06K 9/3208; G06K 9/4604; G06T 7/74
See application file for complete search history.

(56) References Cited

U.S. PATENT DOCUMENTS

| | | | |
|---|---|---|---|
| 7,720,436 B2 | 5/2010 | Hamynen et al. | |
| 8,505,823 B2 | 8/2013 | Bhagwan et al. | |
| 9,064,398 B2 | 6/2015 | Davis | |
| 9,113,076 B2 * | 8/2015 | King | H04N 1/00331 |
| 9,398,210 B2 | 7/2016 | Stach et al. | |

(Continued)

FOREIGN PATENT DOCUMENTS

| | | |
|---|---|---|
| EP | 2399385 | 12/2011 |
| WO | WO-2010096191 | 8/2010 |

OTHER PUBLICATIONS

Five Things to Know Before Choosing an Embedded Data Acquisition Device, http://www.roboticstomorrow.com/ ~ 23 pages ~ May 11, 2017.

*Primary Examiner* — Ian L Lemieux
(74) *Attorney, Agent, or Firm* — Michael A Dryja

(57) ABSTRACT

First and second confidence values are determined. The first confidence value corresponds to a likelihood that, from a position and an orientation of a mobile computing device, the mobile computing device is pointing to a visual code. The second confidence value corresponds to a likelihood that, from an image captured by the mobile computing device, the mobile computing device is pointing to the visual code. Whether the mobile computing device is pointing to the visual code is determined based on the first confidence value and the second confidence value.

20 Claims, 13 Drawing Sheets

(56) References Cited

U.S. PATENT DOCUMENTS

| | | |
|---|---|---|
| 2008/0089552 A1 | 4/2008 | Nakamura et al. |
| 2010/0046842 A1 | 2/2010 | Conwell et al. |
| 2012/0191566 A1 | 7/2012 | Sayan |
| 2015/0310601 A1 | 10/2015 | Rodriguez et al. |
| 2016/0035082 A1 | 2/2016 | King et al. |
| 2019/0087772 A1* | 3/2019 | Medina ................ G05D 1/0246 |

\* cited by examiner

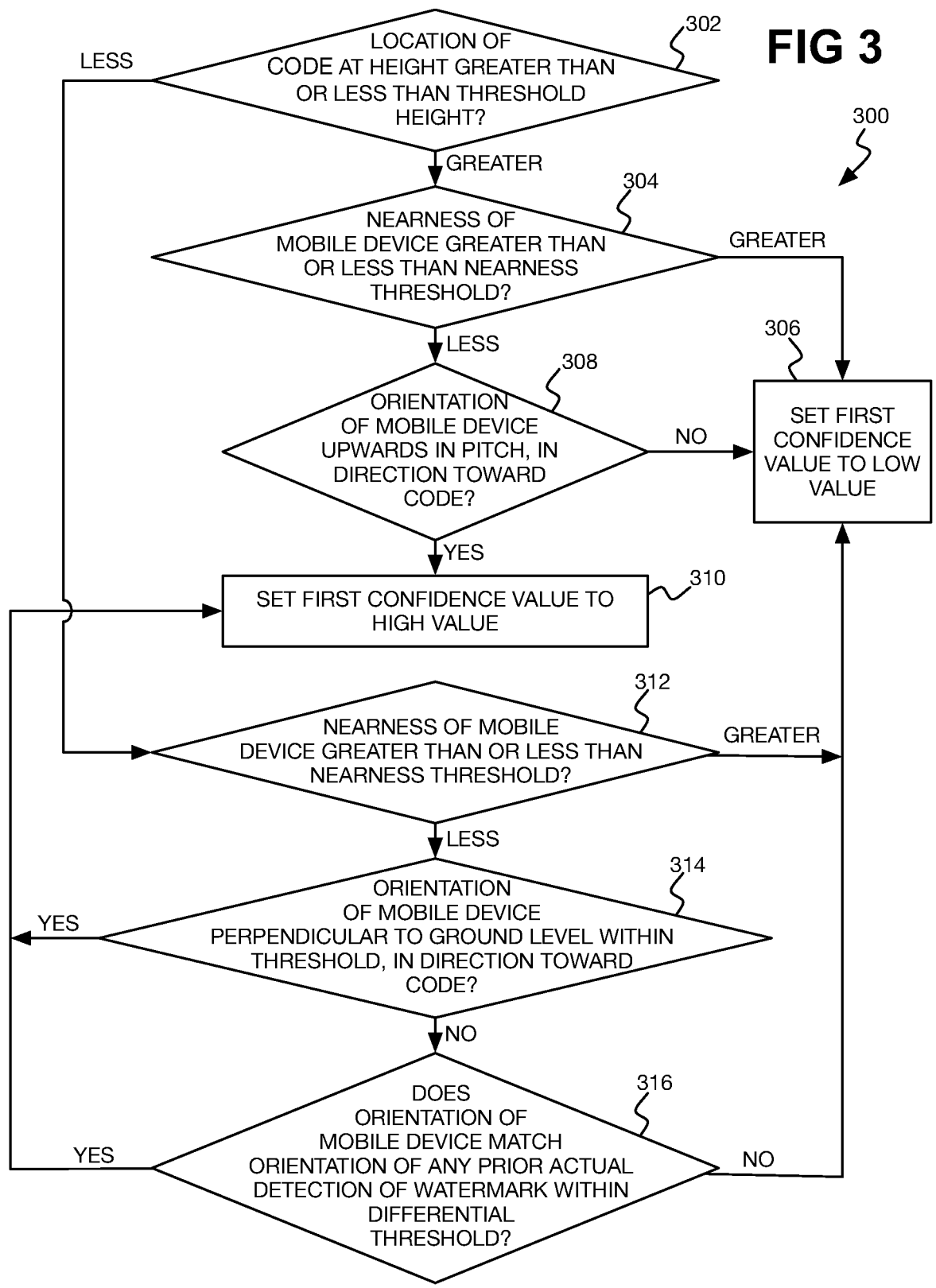

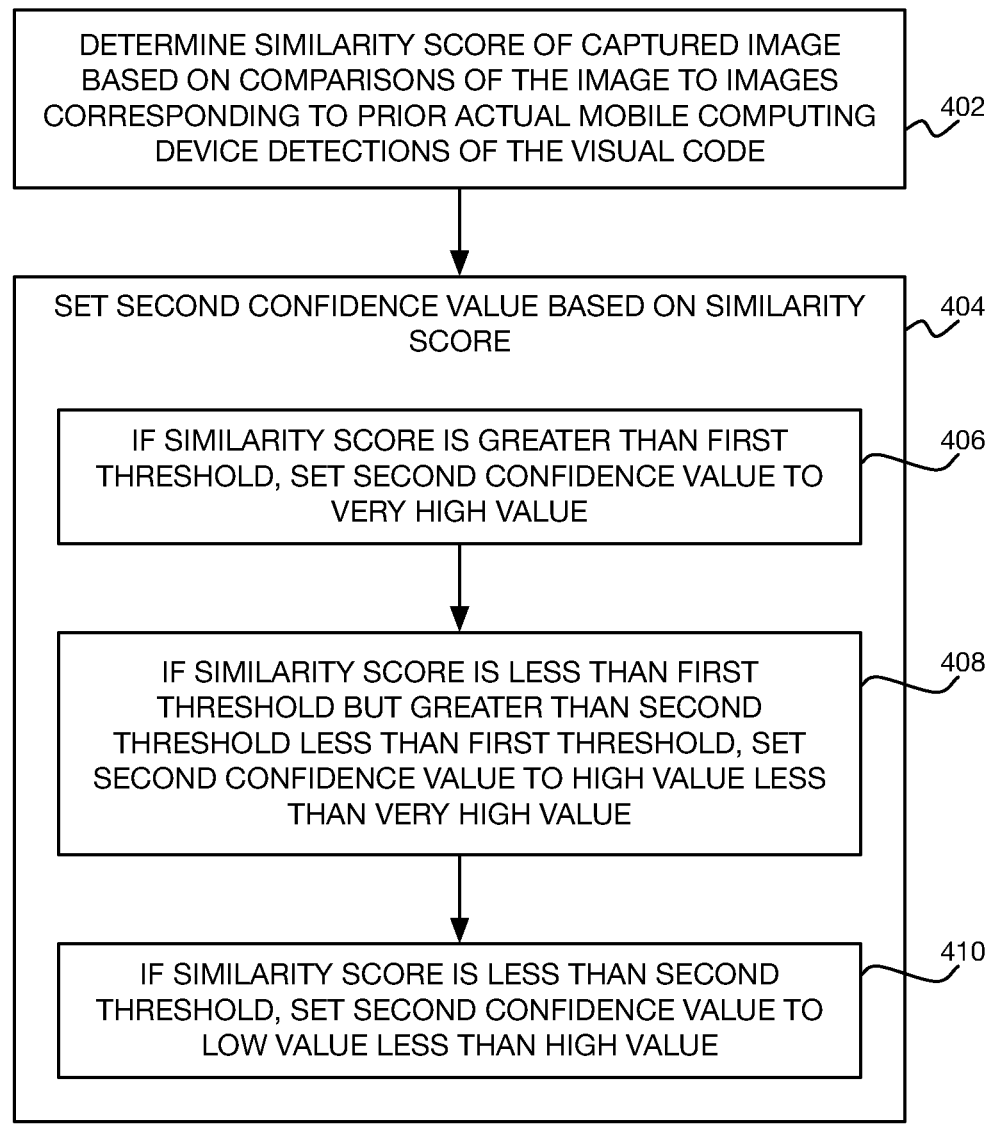

FIG 8A

| CONFIDENCE VALUE | DETECTION RESULT |
|---|---|
| HIGH | YES |
| LOW | NO |

FIG 8B

| SECOND CONFIDENCE VALUE | DETECTION RESULT |
|---|---|
| VERY HIGH | YES |
| HIGH | NO |
| LOW | NO |

FIG 8C

| FIRST CONFIDENCE VALUE | SECOND CONFIDENCE VALUE | DETECTION RESULT |
|---|---|---|
| HIGH | HIGH | YES |
| LOW | ANY | NO |
| ANY | LOW | NO |

FIG 8D

| FIRST CONFIDENCE VALUE | SECOND CONFIDENCE VALUE | DETECTION RESULT |
|---|---|---|
| HIGH | VERY HIGH | YES |
| HIGH | HIGH | YES |
| LOW | ANY | NO |
| ANY | LOW | NO |

FIG 8E

| FIRST CONFIDENCE VALUE | SECOND CONFIDENCE VALUE | THIRD CONFIDENCE VALUE | DETECTION RESULT |
|---|---|---|---|
| HIGH | VERY HIGH | ANY | YES |
| HIGH | HIGH | HIGH | YES |
| LOW | VERY HIGH | HIGH | YES |
| LOW | HIGH | ANY | NO |
| ANY | LOW | ANY | NO |

DETECTION OF WHETHER MOBILE COMPUTING DEVICE IS POINTING TO VISUAL CODE

BACKGROUND

Digital watermarks and other visual codes are visual marks that can be added to or embedded into images that are printed on physical media like paper, cardboard, and labels, which can then be affixed at stationary locations. For example, the media can include signage advertising goods or services and affixed to walls of airports, bus stations, and other public locations. The media can include signage or tags for products that are affixed to or are part of the packaging of the products or the products themselves, or that are affixed to shelving where the products are located and that list information regarding the products.

A visual code may or may not be visible or perceptible to the naked eye, but even if visible or perceptible, is not intuitively understandable to a human viewer. A visual code can be a one- or two-dimensional barcode that is perceptible to the naked eye, but which contains information that is not understandable by a human viewer. A visual code that is not visible or perceptible to the naked eye includes codes that are created by imperceptibly changing low-level aspects of the image in a way that a human viewer will not be able to perceive.

BRIEF DESCRIPTION OF THE DRAWINGS

FIG. 3 is a flowchart of an example method for determining a first confidence value corresponding to a likelihood that a mobile computing device is pointing to a visual code, from the position and orientation of the device, which encompasses the scenarios of FIGS. 1A, 1B, and 1C and the scenarios of FIGS. 2A, 2B, and 2C.

FIG. 4 is a flowchart of an example method for determining a second confidence value corresponding to a likelihood that a mobile computing device is pointing to a visual code, from an image captured by the device, without actually detecting the code within the captured image.

FIGS. 8A, 8B, 8C, 8D, and 8E are diagrams of example rule tables that can be employed to detect whether or not a mobile computing device is pointing to a visual code in the method of FIG. 7, based on which confidence values are determined.

DETAILED DESCRIPTION

Figure 1A:
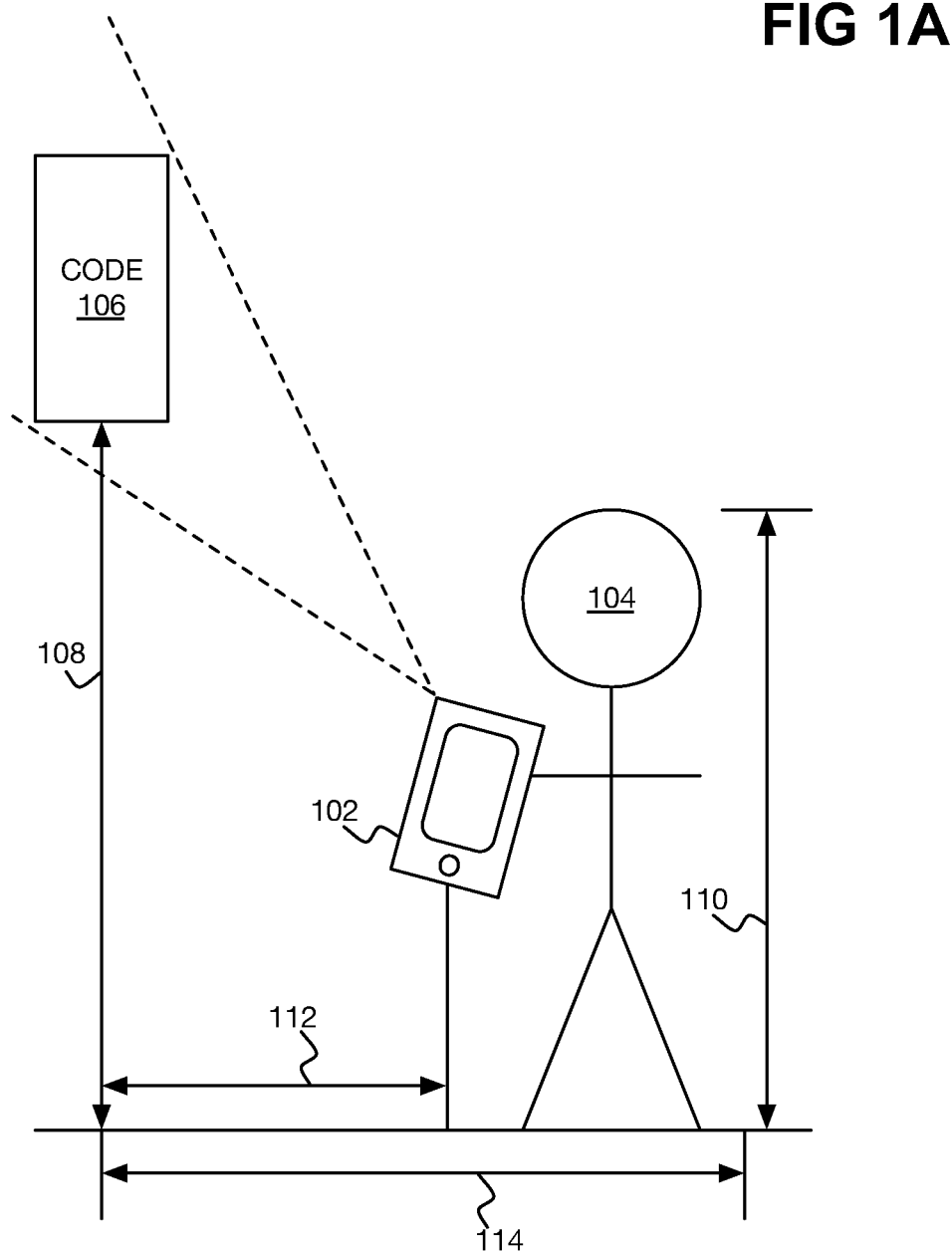
FIGS. 1A, 1B, and 1C are diagrams illustratively depicting example determination of a first confidence value corresponding to a likelihood that a mobile computing device is pointing to a visual code, from the position and orientation of the device, when the visual code has a height greater than a threshold height.

As noted in the background section, digital watermarks and other visual codes are visual marks added to or embedded into images that are printed on physical media that can be affixed at stationary locations. Users can employ mobile computing devices that include digital image-capturing hardware, such as smartphones that include digital cameras, to capture images of the physical media on which the visual code-containing images have been printed. Image processing can then be performed on the captured images at the mobile computing devices, or at another computing device like a server to which the mobile computing devices have uploaded their captured images, to detect the visual codes within the captured images.

Once a visual code has been identified within an image captured by a mobile computing device, a corresponding action can be performed based on the information contained in the visual code. As an example, a user may be viewing an advertisement printed on a sign affixed to the wall of an airport, and that includes a visual code. The user may be interested in learning more about the product or service that is the subject of the advertisement. Therefore, the user can capture an image of the advertisement via his or her smartphone. The smartphone can perform image processing to detect and decode the visual code, which may provide a universal resource locator (URL) address of a web site regarding the product or service. The smartphone can then automatically browse to the web site for the user to peruse.

Similarly, a user may be in a retail store and interested in potentially purchasing a particular type of product. A tag affixed to shelf that lists rudimentary information regarding a product, such as its name and price, may include a visual code. To learn more about the product, the user can capture an image of the tag using his or her smartphone. Imaging processing detects and decodes the visual code within the image, which may similarly provide a URL address of a web site regarding the product that the user can visit using his or her smartphone, or which may result in adding the product to a virtual shopping cart for subsequent easier checkout by the user.

The detection and decoding of visual codes within captured images of physical media can also cause the performance of concrete physical actions. For example, information technology (IT) personnel may be responsible for configuring computing devices like servers. Rather than manually selecting from a number of different computing configurations via a graphical user interface (GUI) displayed on a smartphone to configure a server communicatively connected to the smartphone, the user may capture an image of a physical medium including a visual code corresponding to the selected configuration. The smartphone can then configure the server according to the detected visual code within the captured image.

Similarly, a factory or shop worker may be able to control factory or shop equipment and thus customize the production of products via capturing images of physical media including visual codes. Robotic equipment may physically transform materials like steel, plastic, and so on, in different ways. A worker may capture an image of a physical medium including a visual code corresponding to a particular way by which the robotic equipment is to physically transform a material, resulting in the equipment physically transforming the material according to the selected way of the detected visual code within the captured image. As another example, a worker may capture an image of a physical medium including a visual code corresponding to how printing devices are to print images on media (e.g., in black-and-white versus in color; on cardstock versus on paper; and so on). Once the visual code is detected within the captured image, the printing devices are correspondingly controlled to print images on media according to the information contained within the decoded visual code.

These techniques for utilizing a visual code printed on a physical medium hinge on the ability to detect and decode the visual code within a captured image of the physical medium. If the visual code cannot be detected within a captured image, then no action corresponding to the information contained with visual code can be performed. However, detecting visual codes within images captured by mobile computing devices, like smartphones, may not be possible in certain circumstances. For example, environmental conditions, such as ambient lighting and the distance or angle between the image-capturing hardware and the visual code, can affect the ability of image processing to detect the visual code within an image captured under such conditions.

Furthermore, unintuitively smartphones that have more advanced image-capturing hardware and image-capturing capabilities may capture images in which visual codes are less likely to be detected. For example, the image-capturing hardware may be more advanced in that the hardware can capture images that are more pleasing to the human eye but from which visual codes are less easily detectable. As another example, the image-capturing hardware may automatically perform advanced image processing to remove artifacts from captured images, but which also removes certain details on which basis visual codes may be detected. Therefore, there is no guarantee that newer mobile computing devices will improve visual code detection from their captured images, because generally the goal of improving image-capturing hardware of mobile devices like smartphones is not to aid in visual code detection.

Techniques disclosed herein permit detecting whether a mobile computing device is pointing to a visual code, without actually detecting the visual code within an image captured by the mobile computing device. Either or both of two confidence values may be determined. The first confidence value corresponds to the likelihood that the mobile computing device is pointing to the visual code, from the mobile computing device's position and orientation. The second confidence value corresponds to the likelihood that the mobile computing device is pointing to the visual code, from an image captured by the mobile computing device (without actually detecting the visual code within the image). A third confidence value corresponding to a likelihood that a user of the mobile computing device is attempting to point the device towards any visual code, from the mobile computing device's movement and orientation, may also be used.

As such, the techniques disclosed herein can effectively permit mobile computing devices to detect visual codes even when the visual codes cannot be detected within images captured by the mobile computing devices. Rather, visual code detection is achieved by detecting whether a mobile computing device is pointing to a visual code. Detecting whether a mobile computing device is pointing to a visual code is in turn achieved based on either or both of the two confidence values, and additionally based on a third confidence value, as described above.

Figure 1B:
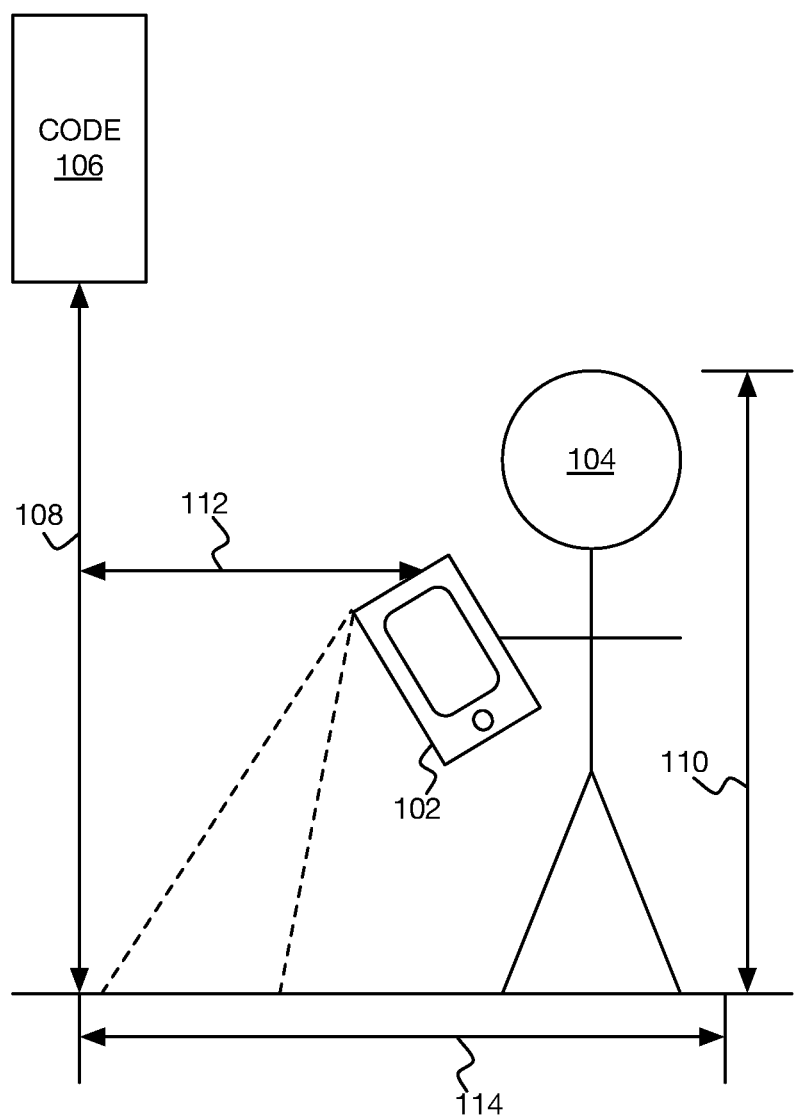
Figure 1C:
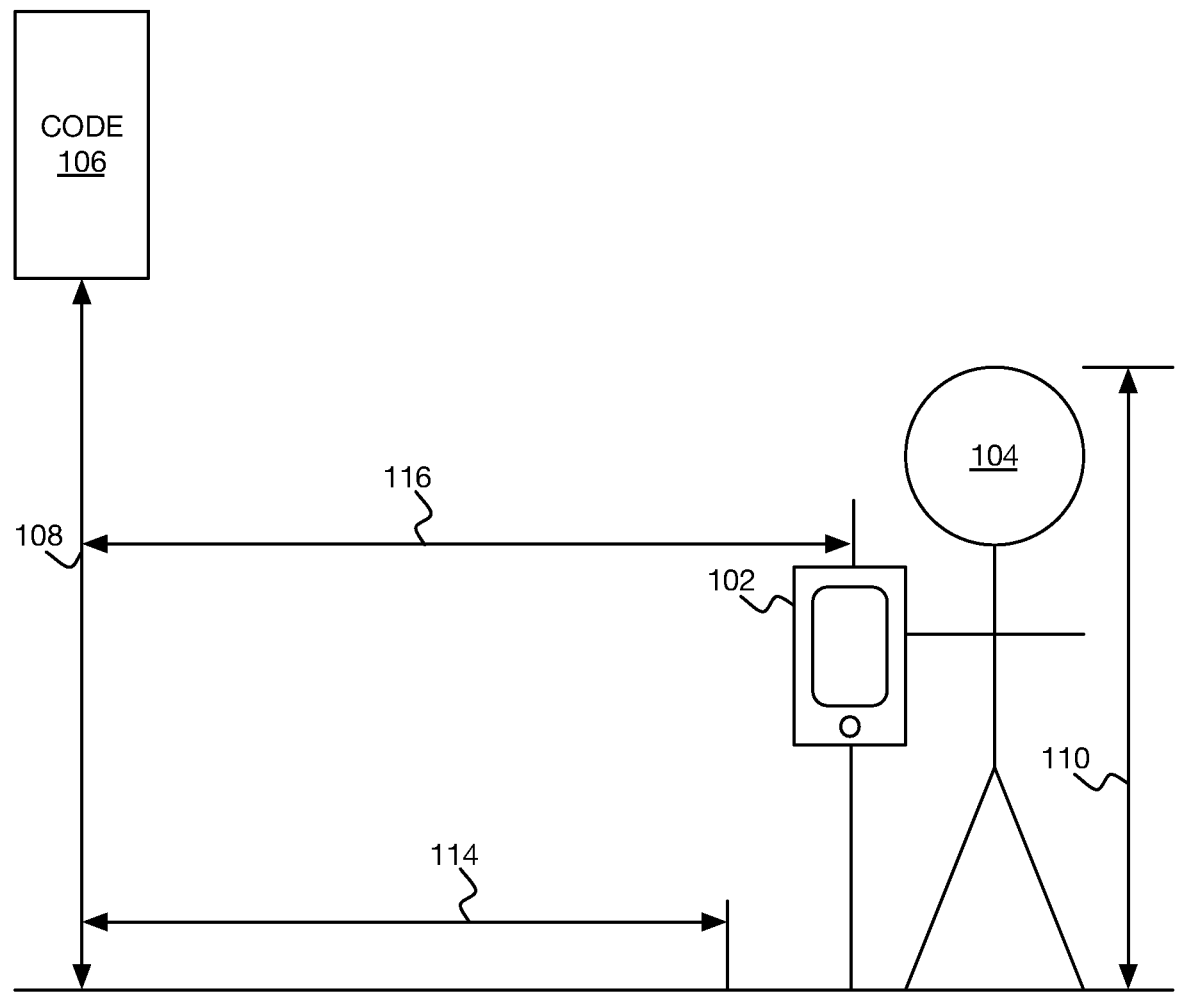

FIGS. 1A, 1B, and 1C illustratively depict example determination of a first confidence value corresponding to the likelihood that a mobile computing device 102, such as a smartphone having a digital camera or other image-capturing hardware, of a user 104 is pointing to a visual code 106, from the position and orientation of the device 102. In the example of FIGS. 1A, 1B, and 1C, the visual code 106 has a location at a height 108 greater than a threshold height 110. The location, and thus the height 108, of the visual code 106 may be prespecified when the code 106 is printed on a physical medium that is affixed to the stationary location in question, such as on a wall. The threshold height 110 may correspond to a median user height, or to a height that is greater than a given percentage of users, such as 80%, 90%, and so on. In the example of FIGS. 1A, 1B, and 1C, the user 104 has a height equal to that of the threshold height.

In FIGS. 1A and 1B, the position of the mobile computing device 102 has a nearness 112 to the location of the visual code 106 less than a nearness threshold 114. By comparison, in FIG. 1C, the position of the mobile computing device 102 has a nearness 116 to the location of the visual code 106 greater than the nearness threshold 114. The position of the mobile computing device 102 can be determined via global positioning system (GPS) hardware of the device 102, or in another manner, such as via a Wi-Fi positioning system for indoor settings in which GPS hardware is less likely to provide an accurate position. The nearness threshold 114 can be prespecified.

The first confidence value corresponding to the likelihood that the mobile computing device 102 of the user 104 is pointing to the visual code 106 is determined from the position and orientation of the device 102 as follows in FIGS. 1A, 1B, and 1C. If the position of the mobile computing device 102 has a nearness less than the nearness threshold 114, such as the nearness 112 in FIGS. 1A and 1B, then the orientation of the device 102 is examined. The orientation of the mobile computing device 102, including its pitch, direction, and so on, may be determined using accelerometer hardware of the device 102, or in another manner, such as via tilt sensor hardware of the device 102.

In FIG. 1A, the orientation of the mobile computing device 102 has an upwards pitch in a direction towards the code 106, whereas in FIG. 1B, the orientation of the device 102 has a downwards pitch in a direction towards the code 106. In FIG. 1A, the first confidence value is set to a prespecified high value, whereas in FIG. 1B, the first confidence value is set to a prespecified low value. The prespecified high value corresponds to a high likelihood that the mobile computing device 102 is pointing to the visual code 106, whereas the prespecified low value corresponds to a low likelihood that the device 102 is pointing to the code 106.

It is noted that it may not actually be known whether the mobile computing device 102 is in fact pointing to the visual code 106 or not in FIG. 1A in particular. What is known is that the visual code 106 has a height 108 greater than a threshold height 110, that the mobile computing device 102 has a nearness 112 to the code 106 less than a nearness threshold 114, and that the device 102 has an upwards pitch in a direction towards the code 106. From these three pieces of information, it is thus concluded that there is a high likelihood that the mobile computing device 102 is pointing to the visual code 106, regardless of whether or not the device 102 is actually pointing to the code 106.

By comparison, in FIG. 1B, there is a low likelihood that the mobile computing device 102 is pointing to the visual code 106, even though the mobile computing device 102 has a nearness 112 to the code 106 less than the nearness threshold 114. This is because the visual code 106 has a height 108 greater than the threshold height 110, and yet the mobile computing device 102 has a downwards pitch in a direction towards the code 106. Because the visual code 106 is located high and the mobile computing device 102 is pointed low, then, the likelihood that the device 102 is pointing to the code 106 is low.

In FIG. 1C, the position of the mobile computing device 102 has a nearness 116 to the visual code 106 greater than the nearness threshold 114. Therefore, in this case, the first confidence value is set to the prespecified low value, regardless of the orientation of the mobile computing device 102. Because the mobile computing device 102 is sufficiently far away from the visual code 106, in other words, it is concluded that the likelihood that the device 102 is pointing to the code 106 is low.

As other examples, the mobile computing device 102 may have a nearness to the visual code 106 within the nearness threshold 114, such as in FIGS. 1A and 1B, but may have an orientation including a pitch in a direction away from the code 106. For example, the user 104 may be pointing the mobile computing device 102 at a pitch upwards as in FIG. 1A, but in an opposite direction than that depicted in FIG. 1A. In such a case, the likelihood that the mobile computing device 102 is pointing to the visual code 106 is low, because even though the nearness of the device 106 is within the nearness threshold 114, the orientation is such that the device 102 is at a pitch in a direction opposite the code 106.

Figure 2A:
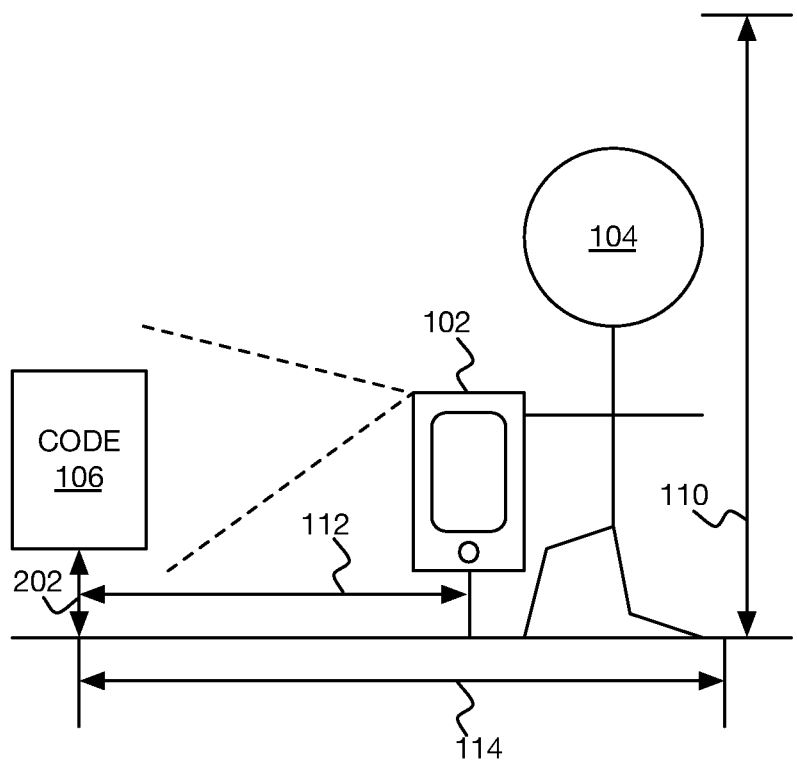
FIGS. 2A, 2B, and 2C are diagrams illustratively depicting example determination of a first confidence value corresponding to a likelihood that a mobile computing device is pointing to a visual code, from the position and orientation of the device, when the visual code has a height less than a threshold height.
Figure 2B:
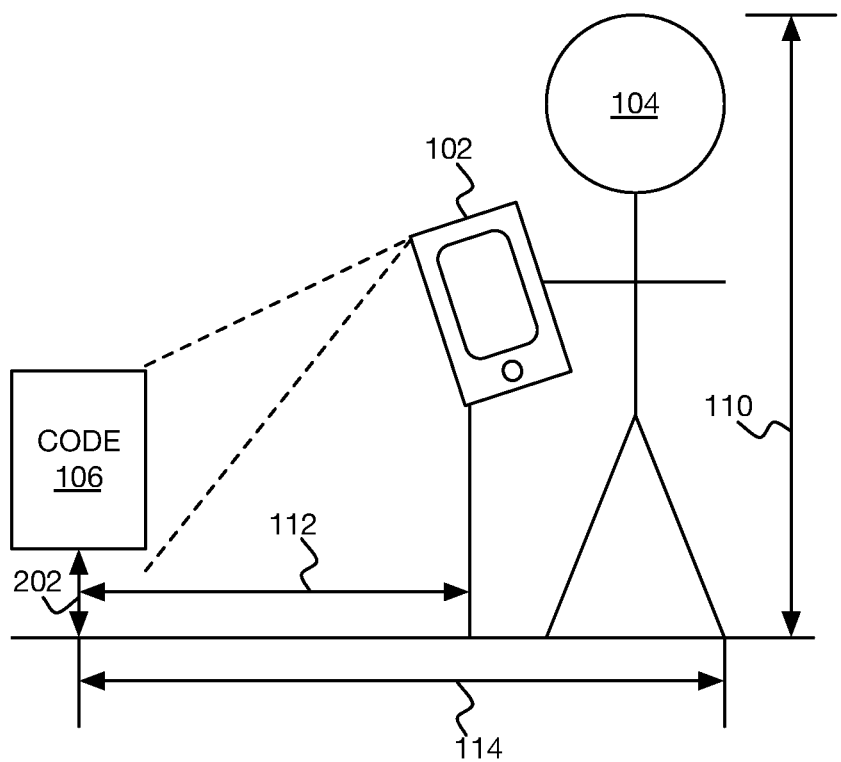
Figure 2C:
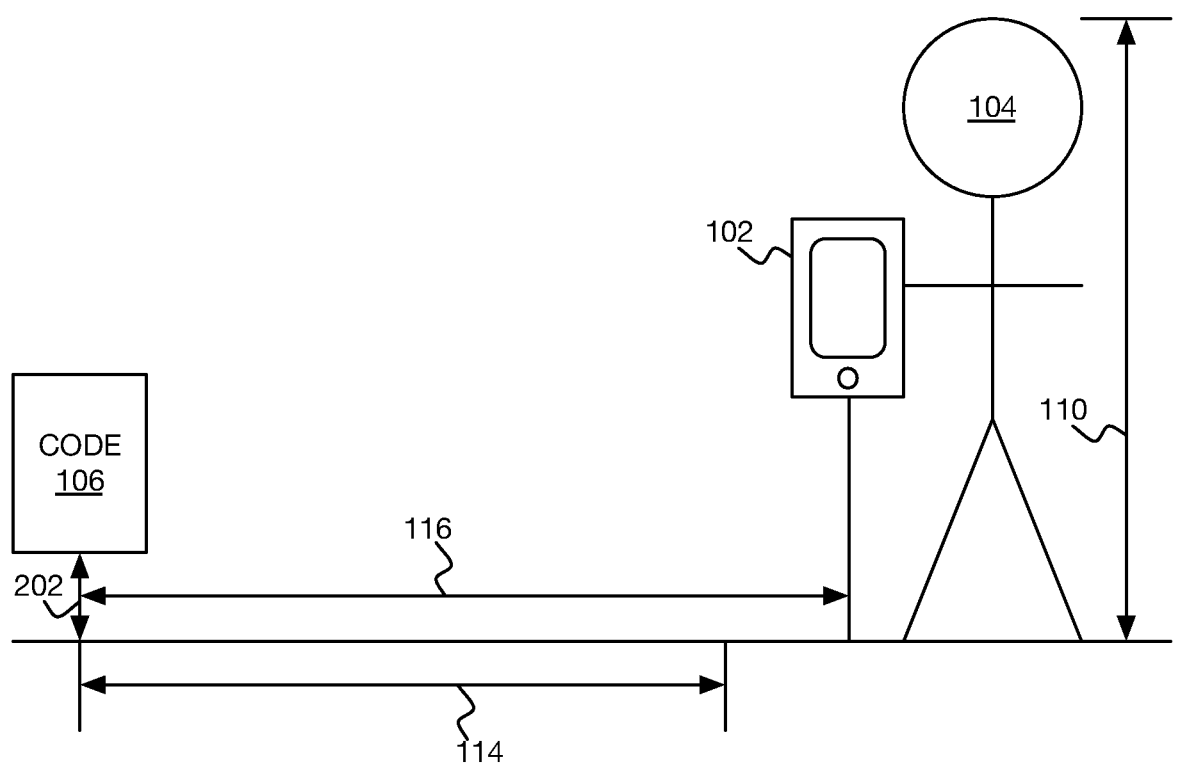

FIGS. 2A, 2B, and 2C also illustratively depict example determination of a first confidence value corresponding to the likelihood that the mobile computing device 102 of the user 104 is pointing to the visual code 106, from the position and orientation of the device 102. In the example of FIGS. 2A, 2B, and 2C, the visual code 106 has a location at a height 202 less than the threshold height 110, as opposed to greater than the threshold height 110 as in FIGS. 1A, 1B, and 1C. In the example of FIGS. 2A, 2B, and 2C, the user 104 again has a height equal to that of the threshold height, but the user is kneeling on one knee in FIG. 2A. In FIGS. 2A and 2B, the position of the mobile computing device 102 has the nearness 112 to the location of the visual code 106 less than the nearness threshold 114. By comparison, in FIG. 2C, the position of the mobile computing device 102 has the nearness 116 greater than the nearness threshold 114.

The first confidence value corresponding to the likelihood that the mobile computing device 102 of the user 104 is pointing to the visual code 106 is determined from the position and orientation of the device 102 as follows in FIGS. 2A, 2B, and 2C. If the position of the mobile computing device 102 has a nearness less than the nearness threshold 114, such as the nearness 112 in FIGS. 2A and 2B, then the orientation of the device 102 is examined. In FIG. 2A, the orientation of the mobile computing device 102 has a pitch perpendicular to ground level within a threshold, and in a direction towards the code 106; that is, the device 102 is parallel to the visual code 106. In FIG. 2B, the orientation of the mobile computing device 102 has a pitch that is not perpendicular to ground level within this threshold; in the specific example of FIG. 2B, the orientation of the device 102 has a downwards pitch, albeit in a direction towards the code 106.

In FIG. 2A, the first confidence value is set to the prespecified high value. It is assumed that the user 104 is attempting to point the mobile computing device 102 towards the visual code 106, because the user 104 is orientating the device 102 parallel to the code 106. The visual code 106 is lower than the threshold height 110, and the height of the user 104 may be unknown. If the user 104 is relatively tall, the user 104 may be kneeling on one knee, as in the specific example of FIG. 2A, or may sit on the ground, so that the user 104 can orientate the mobile computing device 102 parallel to the code 106. If the user 104 is relatively short, the user 104 may remain standing while positioning the mobile computing device 102 parallel to the code 106, such as at below head height, at head height, or even above head height.

As noted above, the visual code 106 is lower than the threshold height 110, and the height of the user 104 may be unknown. It can thus be assumed that the user 104 is attempting to point the mobile computing device 102 towards the visual code 106 when positioning the device 102 parallel to the code 106, as in FIG. 2A. However, if the user 104 is not positioning the mobile computing device 102 parallel to the visual code 106, but the device 102 still has a nearness 112 less than the nearness threshold 114 as in FIG. 2B, the orientation of the device 102 may by itself be non-determinative as to whether the user 104 is pointing the device 102 towards the code 106. Further information, in other words, may have to be employed to determine the likelihood that the user 104 is indeed pointing the mobile computing device 102 towards the visual code 106.

Specifically, metadata regarding prior successful detections of the visual code 106 in images captured by mobile computing devices of other users can be employed. When a mobile computing device of a user captures an image in which the visual code 106 is actually detected via image processing of the captured image, metadata including the orientation of the device when the image was captured may be sent to a central computing device, like a server. When the nearness of the mobile computing device 102 is less than the nearness threshold 114, the orientation of the device 102 when the device 102 captures an image, including the pitch, direction, and so on, of the device 102, can be compared to the orientation of each mobile computing device that captured an image from which the visual code 106 was successfully detected.

As such, if the orientation of the mobile computing device 102 matches the orientation of any prior actual mobile computing device detection of the visual code 106, within an orientation different threshold that can be prespecified, then the first confidence value is set to the prespecified high value. By comparison, if the orientation of the mobile computing device 102 does not match the orientation of any prior actual mobile computing device detection of the visual code 106 within the orientation differential threshold, then the first confidence value is set to the prespecified low value. Therefore, the scenario of FIG. 2B leverages prior actual successful detections of the visual code 106 within images captured by mobile computing devices to determine the likelihood as to whether the user 104 is pointing the mobile computing device 102 towards the code 106.

The comparison of the orientation of the mobile computing device 102 to the orientations of mobile computing devices that previously captured images from which the visual code 106 was successfully detected can be performed at the device 102 itself or at the central computing device. In the former case, the mobile computing device 102 can receive from the central computing device the orientations of mobile computing devices that previously captured images from which the visual code 106 was successfully detected, so that the device 102 can perform the comparison. In the latter case, the mobile computing device 102 can reports its orientation to the central computing device, which can then compare the orientation of the device 102 to the orientations of the mobile computing devices that previously captured images from which the visual code 106 was successfully detected.

In FIG. 2C, the position of the mobile computing device 102 has the nearness 116 to the visual code 106 greater than the nearness threshold 114, as in FIG. 1C. Therefore, in this case, the first confidence value is set to the prespecified low value, regardless of the orientation of the mobile computing device 102. More generally still, when the nearness 116 of the mobile computing device 102 to the visual code 106 is greater than the nearness threshold 114, the first confidence value is set to the prespecified low value, regardless of the orientation of the device 102, and regardless of whether the code 106 is positioned higher than the threshold height 110 as in FIG. 1C or lower as in FIG. 2C.

FIG. 3 shows an example method 300 for determining the first confidence value corresponding to a likelihood that the mobile computing device 102 is pointing to the visual code 106, from the position and the orientation of the device 102. The method 300 reflects the scenarios of FIGS. 1A, 1B, and 1C, and the scenarios of FIGS. 2A, 2B, and 2C, which have been described. The mobile computing device 102 can completely perform the method 300, a central computing device to which the device 102 is communicatively connected can completely perform the method 300, or the device 102 can perform some parts of the method 300 and the central computing device can perform other parts of the method 300. The method 300 may be implemented as program code stored on a non-transitory computer-readable data storage medium and executed by a processor of a device, like the mobile computing device 102 or a central computing device.

In response to determining that the location of the visual code 106 is at a height greater than a threshold height (302), and in response to determining that the mobile computing device 102 has a nearness greater than a nearness threshold (304), the first confidence value is set to a prespecified low value (306). Similarly, if the location of the visual code 106 is at a height greater than the threshold height (302), but the mobile computing device 102 has a nearness greater than the nearness threshold (304), and in response to determining that the orientation of the device 102 is downwards in pitch and/or is in a direction away from the code 106 (308), the first confidence value is set to the low value (306). However, if the location of the visual code 106 is at a height greater than the threshold height (302), and the mobile computing device 102 has a nearness greater than the nearness threshold (304) but has an orientation that is upwards in pitch in a direction towards the code 106 (308), the first confidence value is set to a prespecified high value greater than the low value (310).

By comparison, in response to determining that the location of the visual code 106 is at a height less than the threshold height (302), and in response to determining that the mobile computing device 102 has a nearness greater than the nearness threshold (312), the first confidence value is set to the low value (306). However, if the location of the visual code 106 is at a height less than the threshold height (302), and if the mobile computing device 102 has a nearness less than the nearness threshold (312), and in response to determining that the orientation of the device 102 is perpendicular to ground level within a threshold and in a direction towards the code 106 (314), the first confidence value is set to the high value (310). Similarly, if the location of the code 106 is at a height less than the threshold height (302), and if the device 102 has a nearness less than the nearness threshold (312) but has an orientation other than perpendicular to ground level within a threshold (314), if the orientation of the device 102 matches the orientation of any prior actual detection of the code 106 within an orientation differential threshold (316), the first confidence value is set to the high value (310). However, if the location of the code 106 is at a height less than the threshold height (302), and if the device 102 has a nearness less than the nearness threshold (312) but has an orientation other than perpendicular to ground level within a threshold (314), if the orientation of the device 102 does not match the orientation of any prior actual detection of the code 106 within an orientation differential threshold (316), the first confidence value is set to the low value (306).

The prespecified low value to which the first confidence value is set in part 306 is low in that it is lower than the prespecified high value to which the first confidence value is set in part 310 (and vice-versa). In one implementation, the first confidence value is thus binary. That is, the first confidence value can take on one of two different values: a high value corresponding to a high likelihood that the mobile computing device 102 is pointing towards the visual code 106, or a low value corresponding to a low likelihood that the mobile computing device 102 is pointing towards the visual code 106.

As noted above, when a mobile computing device of a user captures an image in which the visual code 106 is actually detected via image processing of the captured image, metadata including the orientation of the device when the image was captured can be sent to a central computing device, like a server. In the context of determining the first confidence value in the scenario of FIG. 2B, such metadata regarding prior successful detections of the visual code 106 in images captured by mobile computing devices of other users can be used by comparing the orientation of the mobile computing device 102 to the orientation of any of each mobile computing device that captured an image from which the code 106 was successfully detected. Besides sending metadata, a mobile computing device that captures an image in which the visual code is actually detected via image processing of the captured image can also send the image itself to the central computing device. Therefore, these images in which the visual code 106 was previously successfully and actually detected can be employed, in addition to the metadata regarding the images. Such usage of images corresponding to prior actual mobile computing device detections of the visual code 106 is now described.

FIG. 4 shows an example method 400 for determining a second confidence value corresponding to a likelihood that the mobile computing device 102 is pointing to the visual code 106, from an image captured by the device 102, without actually detecting the code 106 within the captured image. The mobile computing device 102 can completely perform the method 400, a central computing device to which the device 102 is communicatively connected can completely perform the method 400, or the device 102 can perform some parts of the method 400 and the central computing device can perform other parts of the method 400. The method 400 may be implemented as program code stored on a non-transitory computer-readable data storage medium and executed by a processor of a device, like the mobile computing device 102 or a central computing device.

A similarity score of the image captured by the mobile computing device 102 is determined based on comparisons between this image and images captured by the mobile computing devices of other users in which the visual code 106 was actually successfully detected (402). A variety of different image processing techniques may be employed to compare the image captured by the mobile computing device 102 and the images corresponding to prior actual mobile computing device detections of the visual code 106. The similarity score is effectively an assessment as to whether the image captured by the mobile computing device 102 is of the same subject matter—i.e., including the visual code 106—as that of the images captured by other mobile computing devices in which the visual code 106 was actually detected.

In one implementation, the mobile computing device 102 may upload the image that it captured to a central computing device, like a server, and the central computing device may determine the similarity score of this image to images corresponding to prior actual mobile computing device detections of the visual code 106. In this implementation, the mobile computing device 102 does not have to receive the images themselves, which may be quite voluminous. In another implementation, however, the central computing device transmits the images corresponding to prior actual mobile computing device detections of the visual code 106 to the mobile computing device 102, and the mobile computing device 102 determines the similarity score. The central computing device in this case may send just images that are near the mobile computing device 102. The central computing device also can reduce the volume of data transmitted by employing other forms to represent the image, such as image descriptors that just describe particular feature points, such as those identified by SIFT, SURF and ORB image processing techniques.

The second confidence value corresponding to the likelihood that the mobile computing device 102 is pointing to the visual code 106 is set based on the determined similarity score (404). In effect, the method 400 leverages that it is known that the previously captured images by the other mobile computing devices include the visual code 106, since the code 106 was actually detected successfully within each such image. Therefore, even if the visual code 106 cannot in actuality be detected within the image that the mobile computing device 102 has captured, the likelihood that the device 102 is pointing to the code 106 can correspond to how similar the captured image is to these other images in which the code 106 was successfully detected.

In one implementation, the second confidence value is set based on the determined similarity score as follows. If the similarity score is greater than a prespecified first threshold, the second confidence value is set to a prespecified very high value (406), corresponding to a very high likelihood that the mobile computing device 102 is pointing towards the visual code 106. If the similarity score is between the first threshold and a prespecified lower second threshold, the second confidence value is set to a prespecified high value less than the very high value (408), corresponding to a lower but still high likelihood that the mobile computing device 102 is pointing towards the visual code 106. If the similarity score is less than the second threshold, the second confidence value is set to a prespecified low value less than the high value (410), corresponding to a low likelihood that the mobile computing device is pointing towards the visual code 106.

In this implementation, the second confidence value is thus ternary. That is, the second confidence value can take on one of three different values: a very high value correspond to a very high likelihood that the mobile computing device 102 is pointing towards the visual code 106, a high value corresponding to a high likelihood that the device 102 is pointing towards the code 106, or a low value corresponding to a low likelihood that the device 102 is pointing towards the code 106. The prespecified very high value is very high in that it is greater than the prespecified high value; similarly, the prespecified low value is low in that it is less than the prespecified high value.

Each of the first and second confidence values that have been described thus correspond to a likelihood as to whether the mobile computing device 102 is pointing to the visual code 106. The difference between the first and second confidence values lies in how their corresponding likelihoods are determined. The first confidence value is determined from the position and the orientation of the mobile computing device 102, whereas the second confidence value is determined from an image captured by the device 102 (in comparison to images corresponding to prior actual mobile computing device detections of the visual code 106).

Additionally, a third confidence value can be determined. The third confidence value does not correspond to the likelihood that the mobile computing device 102 is pointing to the visual code 106 in particular, and thus differs in this respect from the first and second confidence values. Rather, the third confidence value corresponds to the likelihood that the user of the mobile computing device 102 is attempting to point the device 102 towards a visual code, regardless of whether the visual code is the visual code 106 or not. That is, the third confidence value corresponds to the likelihood that the user of the mobile computing device 102 is attempting to point the device 102 towards any visual code.

Figure 5A:
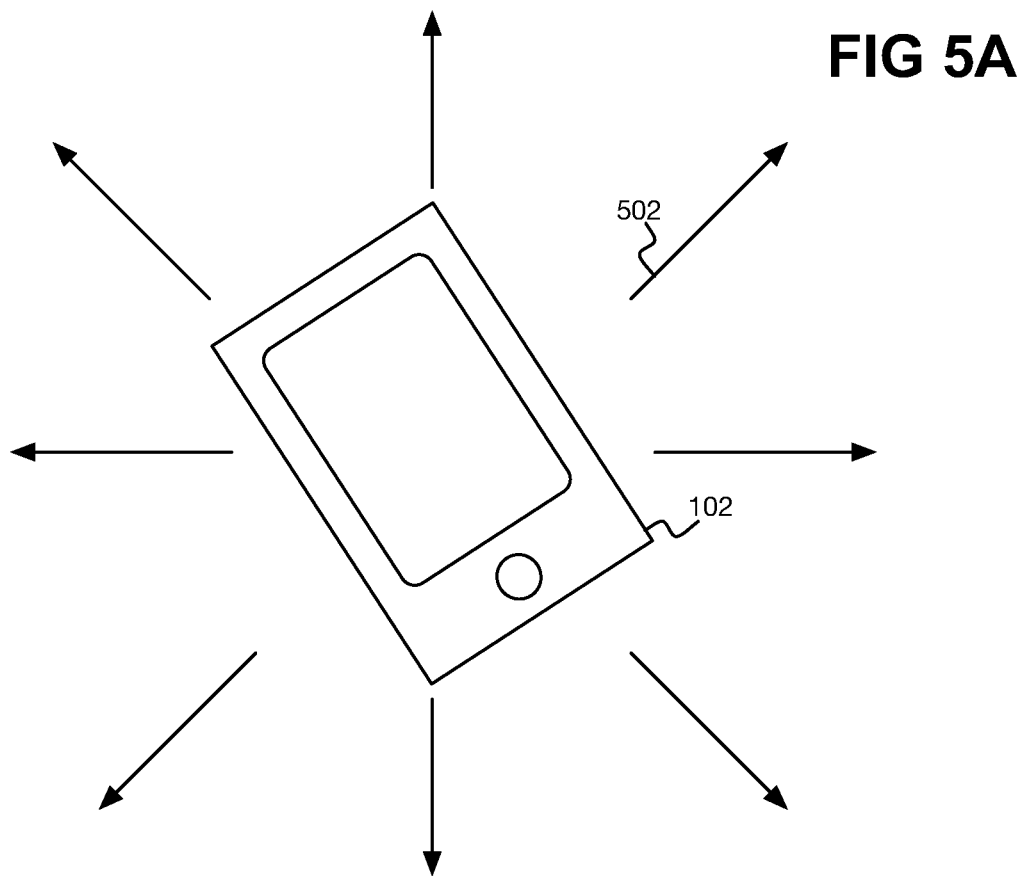
FIGS. 5A, 5B, and 5C are diagrams illustratively depicting example determination of a third confidence value corresponding to a likelihood that a user of a mobile computing device is attempting to point the device towards any visual code, from movement and orientation of the device.
Figure 5B:
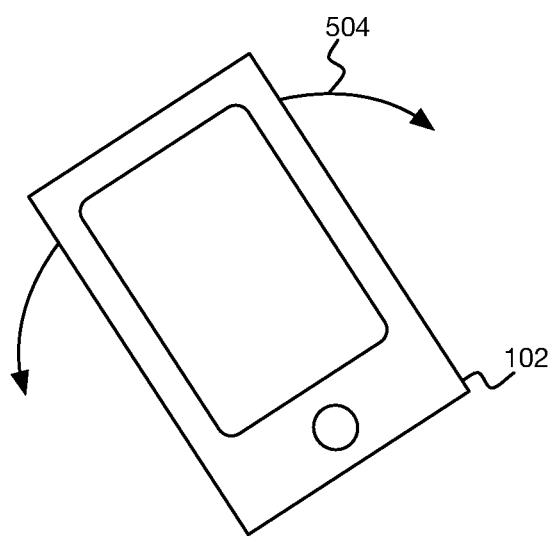
Figure 5C:
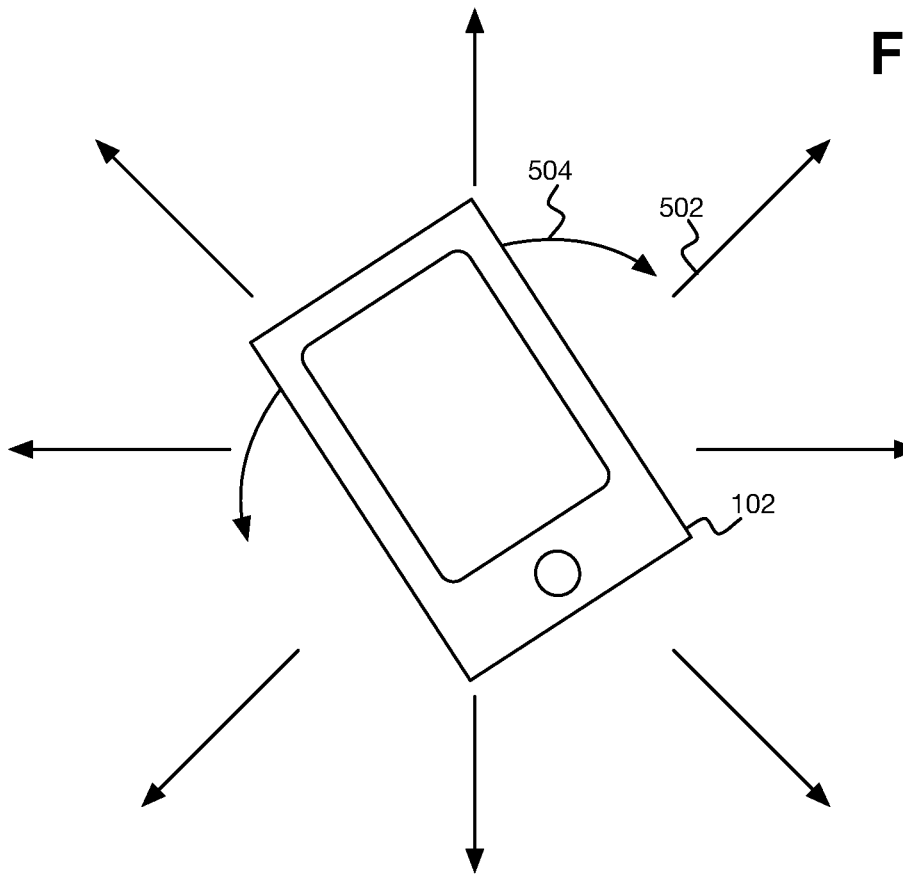

FIGS. 5A, 5B, and 5C illustratively depicts example determination of a third confidence value corresponding to the likelihood that the user of the mobile computing device 102 is attempting to point the device 102 towards any visual code. Specifically, the third confidence value is determined from movement and orientation of the mobile computing device 102. The user of the mobile computing device 102 is not shown in FIGS. 5A, 5B, and 5C for illustrative clarity and convenience. The visual code to which the user may be attempting to point the mobile computing device 102 is not depicted in FIGS. 5A, 5B, and 5C, because the presence of such a visual code does not have to factor into determination of the third confidence value.

In FIG. 5A, the user is keeping the orientation of the mobile computing device 102 relatively, substantially, or completely steady or still (i.e., within a prespecified threshold), while moving the device 102 in one or more varying directions, such as those indicated by arrows 502 (i.e., by more than a prespecified threshold amount). That the user is maintaining the orientation of the mobile computing device 102 can mean, for instance, that the pitch of the device 102 is maintained, which in the example of FIG. 5A is a downwards pitch. However, there is translational movement of the mobile computing device 102 in FIG. 5A.

By comparison, in FIG. 5B, the user is keeping the translation movement of the mobile computing device 102 relatively, substantially, or completely steady or still (i.e., within a prespecified threshold); in this respect, there are no arrows 502 in FIG. 5B. However, the user is changing the orientation of the mobile computing device 102 (i.e., by more than a prespecified threshold amount), such as by rotating the device 102 as indicated by arrows 504. Therefore, in FIG. 5B, there is no translation movement of the mobile computing device 102, but the device 102 is undergoing change in orientation, such as pitch.

In FIG. 5C, the user is both moving the mobile computing device 102 and changing the orientation of the device 102. Like in FIG. 5A, then, there is translational movement of the mobile computing device 102, and like in FIG. 5B, there is a change in orientation of the device 102. In this respect, FIG. 5C includes both the arrows 502 of FIG. 5A and the arrows 504 of FIG. 5B. Whether there is change in movement and/or change in orientation of the mobile computing device 102 can be determined using varied hardware sensors of the mobile computing device 102, such as GPS hardware, Wi-Fi positioning system hardware, accelerometer hardware, tilt sensor hardware, and so on.

The third confidence value is set to a prespecified high value in the scenario of FIG. 5A, whereas the third confidence value is set to a prespecified low value in the scenarios of FIGS. 5B and 5C. Setting of the third confidence value to a high value in FIG. 5A leverages the novel observation that a user who is maintaining the orientation of the mobile computing device 102 steady while moving the device 102 (i.e., inwards and outwards relative to the user, up and down, left and right, and so on) is likely attempting to point the device 102 towards something like a visual code. By comparison, if the user is changing the orientation of the mobile computing device 102 as in FIGS. 5B and 5C, regardless of whether the user is not moving the device 102 as in FIG. 5B or is moving the device 102 as in FIG. 5C, then the user is unlikely to be attempting to point the device 102 towards something like a visual code.

Figure 6:
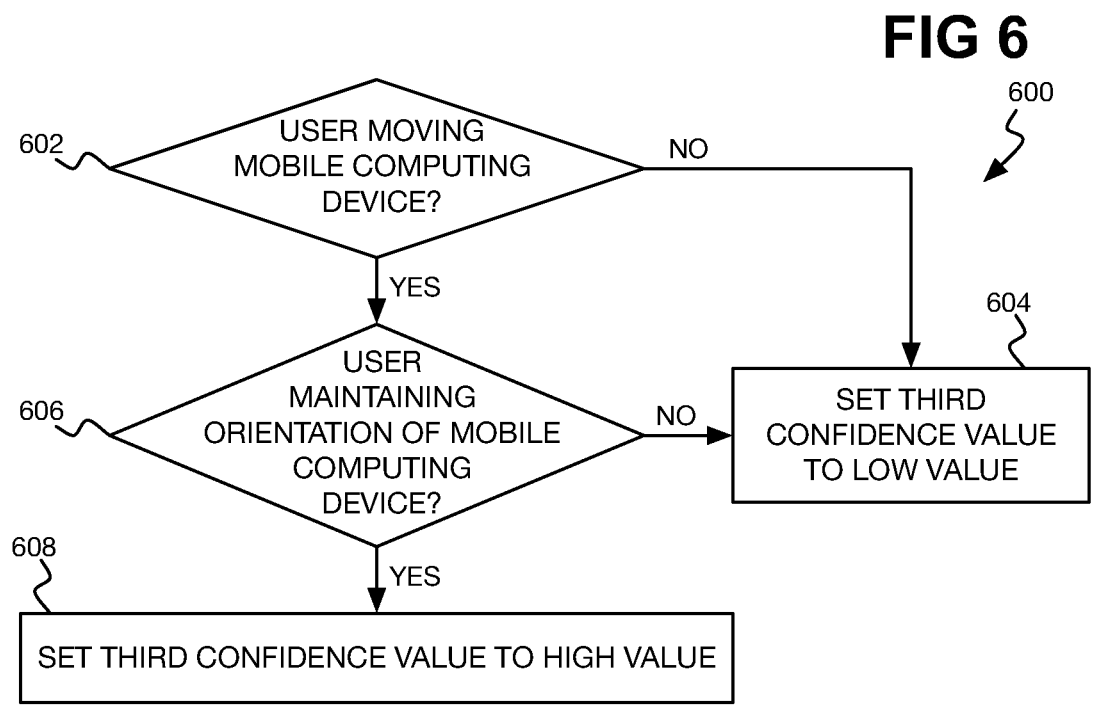
FIG. 6 is a flowchart of an example method for determining a third confidence value corresponding to a likelihood that a user of a mobile computing device is attempting to point the device towards any visual code, from movement and orientation of the device, which encompasses the scenarios of FIGS. 5A, 5B, and 5C.

FIG. 6 shows an example method 600 for determining the third confidence value corresponding to a likelihood that the user of the mobile computing device 102 is attempting to point the device 102 towards any visual code 106, from the movement and the orientation of the device 102. The method 600 reflects the scenarios of FIGS. 5A, 5B, and 5C that have been described. The mobile computing device 102 can completely perform the method 600, a central computing device to which the device 102 is communicatively connected can completely perform the method 600, or the device 102 can perform some parts of the method 600 and the central computing device can perform other parts of the method 600. The method 600 may be implemented as program code stored on a non-transitory computer-readable data storage medium and executed by a processor of a device, like the mobile computing device 102 or a central computing device.

In response to determining that the user is not moving the mobile computing device 102 (602), the third confidence value is set to the low value (604). Similarly, in response to determining that the user is moving the mobile computing device 102 (602) but is not maintaining the orientation of the device 102 (606), the third confidence is still set to the low value (604). However, in response to determining that the user is moving the mobile computing device 102 (602) and is maintaining the orientation of the device 102 (606), the third confidence value is set to the high value (608).

The prespecified low value to which the third confidence value is set in part 604 is low in that it is lower than the prespecified high value to which the third confidence value is set in part 608 (and vice-versa). In one implementation, the third confidence value is thus binary. That is, the third confidence value can take on one of two different values: a high value corresponding to a high likelihood that the user is attempting to point the mobile computing device 102 towards any visual code, or a low value corresponding to a low likelihood that the user is attempting to point the device 102 towards any visual code.

Figure 7:
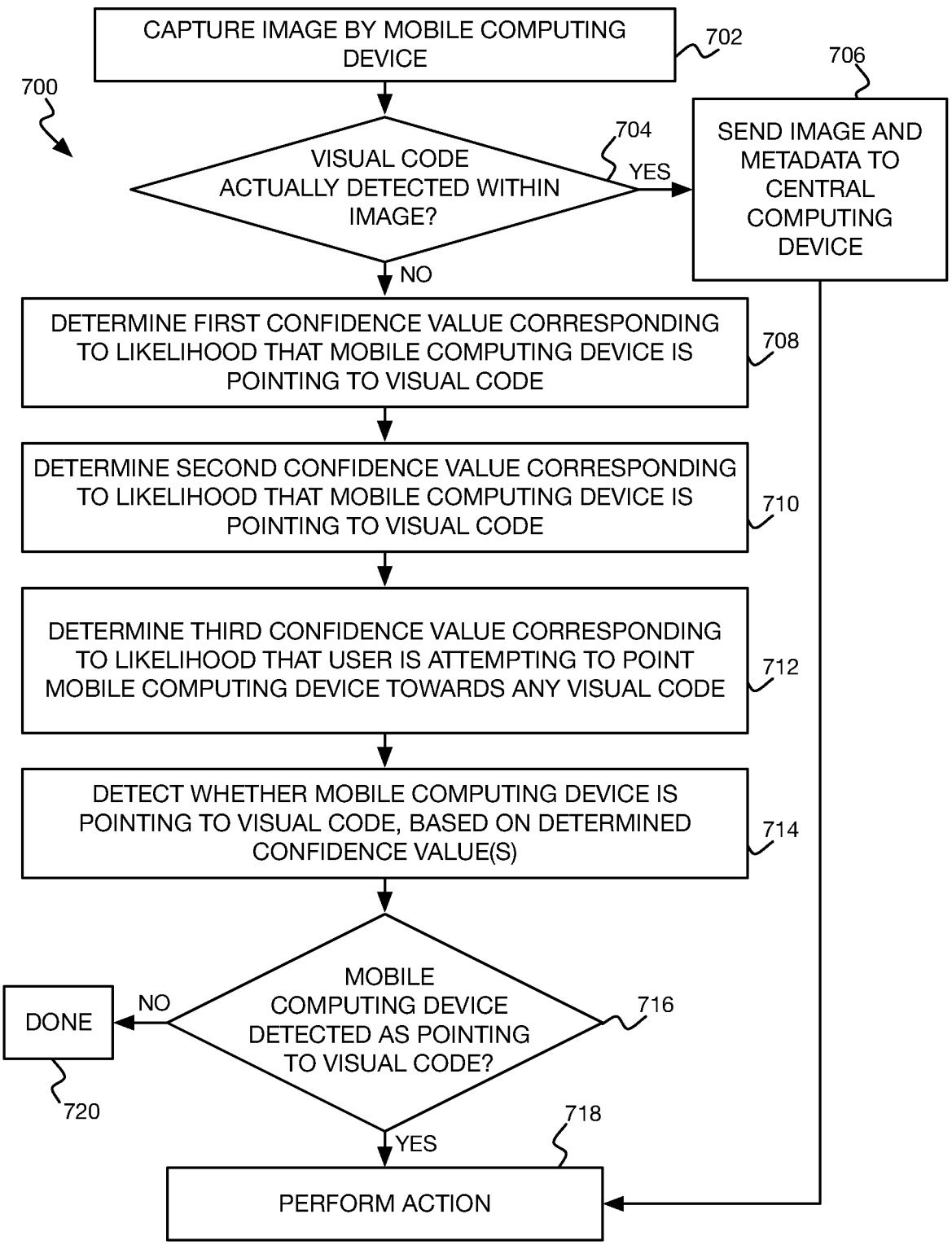
FIG. 7 is a flowchart of an example method for performing an action based on whether a mobile computing device captures an image in which a visual code is successfully detected, or whether the device is detected as pointing to the visual code without the code being actually detected within the image. The method of FIG. 7 can employ the methods of FIGS. 3, 4, and 6 to determine confidence values.

FIG. 7 shows an example method 700 for performing an action based on whether the mobile computing device 102 captures an image in which the visual code 106 is successfully detected, or whether the device 102 is detected as pointing to the visual code 106 without the code 106 being actually detected within the image. The method 700 thus can be inclusive of the methods 300, 400, and 600 of FIGS. 3, 4, and 6, for determining the first, second, and third confidence values. The mobile computing device 102 can completely perform the method 600, or the device 102 can perform some parts of the method 600 and a central computing device to which the device 102 is communicatively connected can perform other parts of the method 600. The method 600 may be implemented as program code stored on a non-transitory computer-readable data storage medium and executed by a processor of a device, like the mobile computing device 102 or a central computing device.

A user causes the mobile computing device 102 to capture an image (702). If the visual code 106 is actually detected within the captured image (704), such as via performing suitable image processing to determine whether the captured image includes the visual code 106, then the mobile computing device 102 can send the image and metadata to the central computing device (706). The metadata can include the location of the mobile computing device 102 and the orientation of the device 102 when the image was captured. The central computing device thus can store captured images and metadata from various mobile computing devices including the mobile computing device 102, for subsequent usage when detecting if other mobile computing devices are pointing to the visual code 106.

If the visual code 106 is not successfully detected within the captured image (704), however, then the first confidence value corresponding to the likelihood that the mobile computing device 102 is pointing to the visual code 106 is determined (708), and/or or the second confidence value corresponding to this likelihood is determined (710). The first confidence value can be determined in part 708 by performing the method 300 that has been described, whereas the second confidence value can be determined in part 710 by performing the method 400 that has been described. The third confidence value corresponding to the likelihood that the user is attempting to point the mobile computing device 102 towards any visual code may also be determined (712), such as by performing the method 600.

Whether the mobile computing device is 102 pointing to the visual code 106 is then detected, based on the confidence value(s) that have been determined (714). Specific examples of effectuating this detection are described later in the detailed description. If the mobile computing device 102 has been detected as pointing to the visual code 106 (716), then an action, such as a concrete action, can be performed (718), examples of which have been described above. Part 718 is also performed if the visual code 106 is actually detected within the image in part 704. If the mobile computing device 102 has not been detected as pointing to the visual code 106 (716), however, then the method 700 is finished (720) without performing the action in part 718. However, a different action may instead be performed in part 718.

FIGS. 8A, 8B, 8C, and 8D show example rule tables 800, 820, 840, 860, and 880, respectively, for detecting, or determining, whether the mobile computing device 102 is pointing to the visual code 106 based on the determined confidence value(s). As such, the rule tables 800, 820, 840, 860, and 880 effectively implement part 714 of the method 700. The rule table 800 of FIG. 8A may be used if just the first confidence value is determined, specifically as a binary value. If the first confidence value is determined as a high value, then the mobile computing device 102 is detected as pointing to the visual code 106, whereas if the first confidence value is determined as a low value, then the device 102 is not detected as pointing to the code 106.

The rule table 820 of FIG. 8B may be used if just the second confidence value is determined, as a ternary value. If the second confidence value is determined as a very high value, then the mobile computing device 102 is detected as pointing to the visual code 106, whereas if the second confidence value is determined as a high or a low value, then the device 102 is not detected as pointing to the code 106. If the second confidence value is instead determined as a binary value, then the rule table 800 of FIG. 8A may be employed instead of the rule table 820 of FIG. 8B.

The rule tables 840 and 860 of FIGS. 8C and 8D, respectively, apply to the scenario in which both the first and second confidence values are determined, and the third confidence value is not determined. The rule table 840 of FIG. 8C may be used if both the first and second confidence values are determined as binary values. If both the first and second confidence values are high, then the mobile computing device 102 is detected as pointing to the visual code 106, whereas if either or both of the first and second confidence values are low, then the device 102 is not detected as pointing to the code 106.

The rule table 860 of FIG. 8D may be used if the first confidence value is determined as a binary value, and the second confidence value is determined as a ternary value. If the first confidence value is high, and the second confidence value is high or very high, then the mobile computed device 102 is detected as pointing to the visual code 106. However, if either or both of the first and second confidence values are low, then the device 102 is not detected as pointing to the code 106.

The rule table 880 of FIG. 8E may be used when the first confidence value is determined as a binary value, the second confidence value is determined as a ternary value, and the third confidence value is determined as a binary value. If the first confidence value is high, and the second confidence value is very high, then the mobile computing device 102 is detected as pointing to the visual code 106, regardless of the value of the third confidence value. However, if both the first and second confidence values are high (i.e., the second confidence value is high and not very high), then the third confidence value also has to be high for the mobile computing device 102 to be detected as pointing to the visual code 106.

By comparison, if the second confidence value is very high and the first confidence value is low, then the third confidence value also has to be high for the mobile computing device 102 to be detected as pointing to the visual code 106. If the first confidence value is low, though, and the second confidence value is just high (i.e., is not very high), then the mobile computing device 102 is not detected as pointing to the visual code 106, regardless of the value of the third confidence value. Finally, if the second confidence value is low, then the mobile computing device 102 is likewise not detected as pointing to the visual code 106, regardless of the values of the first and third confidence values.

The tables 800, 820, 840, 860, and 880 have been described with respect to the confidence values being binary or ternary values. In other implementations, the confidence value may take on more than two or three values, and indeed may be real numbers. In this respect, the tables 800, 820, 840, 860, and 880 also can be said to describe thresholds governing whether or not the computing device 102 is detected as pointing to the visual code 106. For example, in the table 820, if the second confidence value has a value, such as very high, greater than a threshold, then the detection result is positive (i.e., the computing device 102 is detected as pointing to the visual code 106). If the second confidence value has a value, such as high or low, less than this first threshold, then the detection result is negative (i.e., the computing device 102 is not detected as pointing to the visual code 106).

As another example, in the table 860, if the first confidence value has a value, such as high, greater than a first threshold, and the second confidence value has a value, such as high or very high, greater than a second threshold, then the detection result is positive. However, if the first confidence value is less than the first threshold and/or the second confidence value is less than the second threshold, then the detection result is negative. The first and second thresholds may be the same or different.

Figure 9:
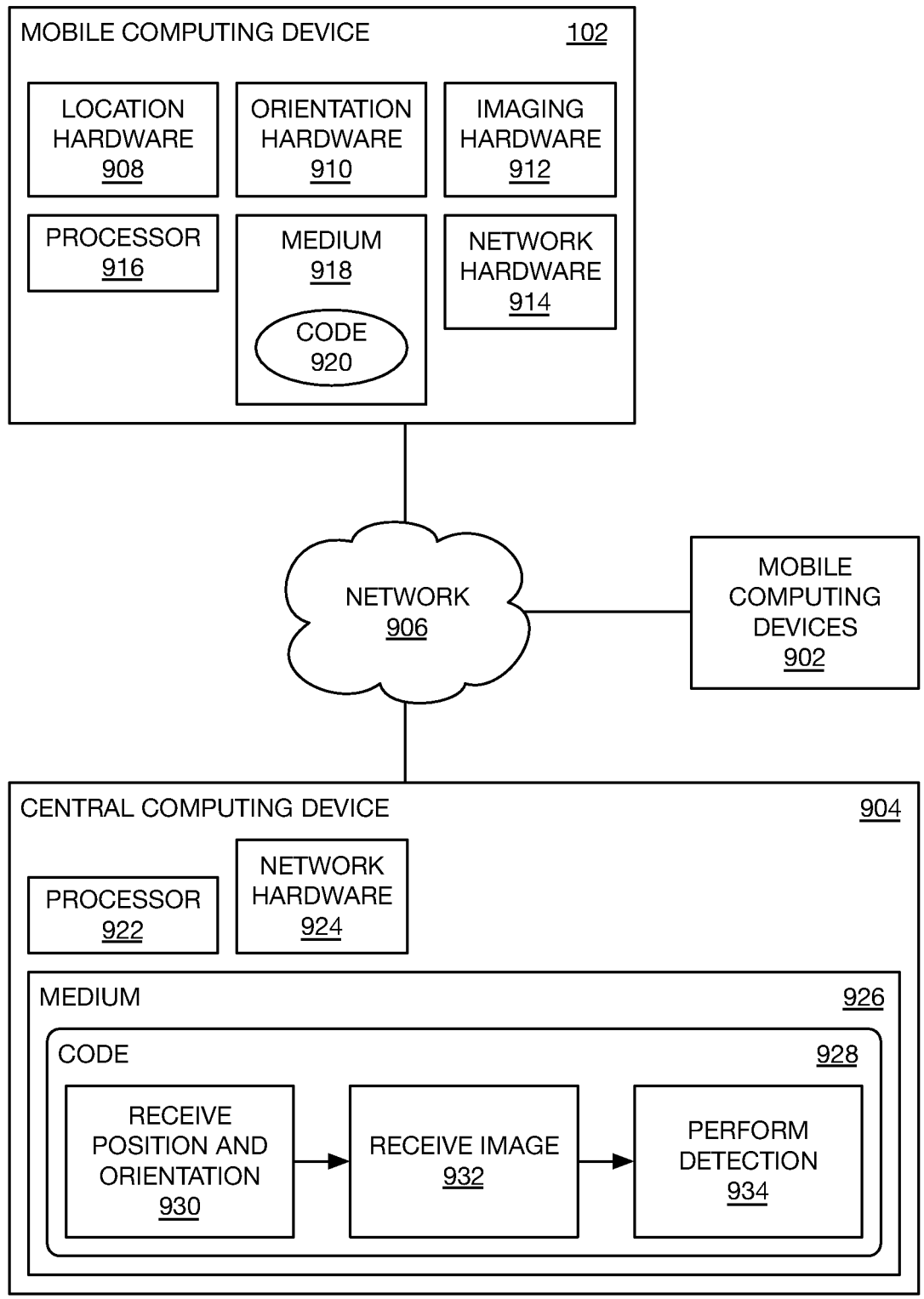
FIG. 9 is a diagram of an example system, in relation to which the method of FIG. 7 can be performed.

FIG. 9 shows an example system 900 in relation to which the method 700 of FIG. 7 can be performed. The system 900 includes the mobile computing device 102, one or more other mobile computing devices 902, and a central computing device 904, all of which are communicatively connected via a network 906. The mobile computing device 102 may be a smartphone, for instance, as can the mobile computing devices 902. The mobile computing device 102 is depicted in detail in FIG. 9, but the mobile computing devices 902 can be implemented in a similar manner. The central computing device 904 can be a server. The network 906 can be or include the Internet, intranets, extranets, local-area networks (LANs), wide-area networks (WANs), wired networks, wireless networks, mobile telephony data networks, and so on.

The mobile computing device 102 can include location hardware 908, orientation hardware 910, imaging hardware 912, network hardware 914, a processor 916, and a non-transitory computer-readable data storage medium 918. The location hardware 908 determines the location of the device 102, and can include GPS hardware. The orientation hardware 910 determines the orientation of the device 102, and can include accelerometer hardware, tilt sensor hardware, magnetometer, and so on. The imaging hardware 912 permits the device 102 to capture an image, and may be digital camera or digital video-recording hardware. The network hardware 914 communicatively connects the device 102 to the network 906, and may be wireless network hardware such as Wi-Fi network hardware, mobile telephone data network hardware, and so on. In the case where the network hardware 914 includes Wi-Fi network hardware, the location hardware 908 can be coextensive with the network hardware 914 to determine the location of the device 102 via a Wi-Fi positioning system. The processor 916 executes program code stored 920 on the medium 918, to perform at least some parts of the methods that have been described.

The central computing device 904 can include a processor 922, network hardware 924, and a non-transitory computer-readable medium 926. The network hardware 924 communicatively connects to the device 904 to the network 906, and may be wired network hardware such as Ethernet network hardware. The processor 922 executes program code 928 stored on the medium 928, to perform at least some parts of the methods that have been described. For instance, the central computing device 902 may receive the position and orientation of the mobile computing device 102 from the device 102 (930), and an image captured by the device 102 while at the position and the orientation in question (932). On the basis of this information, the central computing device 904 can detect whether the mobile computing device 902 is pointed to a visual code, without actually detecting the code within the image captured by the mobile computing device 102.

The techniques that have been described herein thus provide for detection as to whether a mobile computing device is pointing to a visual code, without actually detecting the visual code with an image captured by the mobile computing device. Therefore, even if environmental conditions in which the image was captured or the imaging hardware of the mobile computing device precludes actual detection of the visual code within the image, an action may be performed as if the code were detected within the image. Such an action is performed instead on the basis that the mobile computing device has been detected as pointing to the visual code.

We claim:

1. A method comprising:
   determining a first confidence value corresponding to a likelihood that, from a position and an orientation of a mobile computing device, the mobile computing device is pointing to a visual code having a location at a height greater than a threshold height, by:
      in response to the position of the mobile computing device having a nearness to the location of the visual code less than a nearness threshold and in response to the orientation of the mobile computing device indicating an upwards pitch in a direction towards the visual code, setting the first confidence value to a high value; and
      in response to the position of the mobile computing device having the nearness to the location of the visual code less than the nearness threshold and in response to the orientation of the mobile computing device indicating a downwards pitch or in a direction away from the visual code, setting the first confidence value to a low value less than the high value;
   determining a second confidence value corresponding to a likelihood that, from an image captured by the mobile computing device, the mobile computing device is pointing to the visual code; and
   detecting whether the mobile computing device is pointing to the visual code, based on the first confidence value and the second confidence value.

2. The method of claim 1, wherein whether the mobile computing device is pointing to the visual code is detected based on the first confidence value and the second confidence value without actually detecting the visual code within the image captured by the mobile computing device.

3. The method of claim 1, further comprising:
   in response to detecting that the mobile computing device is pointing to the visual code, performing a concrete action.

4. The method of claim 1, wherein detecting whether the mobile computing device is pointing to the visual code comprises:
   in response to the first confidence value being greater than a first threshold and the second confidence value being greater than a second threshold, detecting that the mobile computing device is pointing to the visual code.

5. The method of claim 1, further comprising:
   determining a third confidence value corresponding to a likelihood that, from movement and the orientation of the mobile computing device, a user of the mobile computing device is attempting to point the mobile computing device towards any visual code,
   wherein detecting whether the mobile computing device is pointing to the visual code comprises:
      in response to the first confidence value being less than a first threshold, the second confidence value being greater than a second threshold, and the third confidence value being greater than a third threshold, detecting that the mobile computing device is pointing to the visual code; and
      in response to the first confidence value being greater than the first threshold, the second confidence value being less than the second threshold, and the third confidence value being greater than the third threshold, detecting that the mobile computing device is pointing to the visual code.

6. The method of claim 1, wherein detecting whether the mobile computing device is pointing to the visual code comprises:
   in response to the first confidence value being greater than a first threshold and the second confidence value being less than a second threshold but greater than a third threshold, detecting that the mobile computing device is pointing to the visual code.

7. The method of claim 1, wherein determining the first confidence value further comprises:
   in response to the position of the mobile computing device having the nearness to the location of the visual code greater than the nearness threshold, setting the first confidence value to the low value regardless of the orientation of the mobile computing device.

8. A mobile computing device comprising:
   location hardware to determine a location of the mobile computing device;
   orientation hardware to determine an orientation of the mobile computing device;
   imaging hardware to capture an image;
   a non-transitory computer-readable medium storing program code; and
   a processor to execute the program code to:
      determine a first confidence value corresponding to a likelihood that, from the position and the orientation of the mobile computing device, the mobile computing device is pointing to a visual code having a location at a height less than a threshold height, by:
         in response to the position of the mobile computing device having a nearness to the location of the visual code less than a nearness threshold and in response to the orientation of the mobile computing device indicating a pitch perpendicular to ground level within a threshold and in a direction towards the visual code, setting the first confidence value to a high value; and
         in response to the position of the mobile computing device having the nearness to the location of the visual code greater than the nearness threshold, setting the first confidence value to a low value less than the high value regardless of the orientation of the mobile computing device;
      determine a second confidence value corresponding to a likelihood that, from a comparison of the image to a plurality of images corresponding to prior actual mobile computing device detections of the visual code, the mobile computing device is pointing to the visual code; and detect whether the mobile computing device is pointing to the visual code based on the first confidence value and the second confidence value.

9. The mobile computing device of claim 8, wherein whether the mobile computing device is pointing to the visual code is detected based on the first confidence value and the second confidence value without actually detecting the visual code within the image captured by the mobile computing device.

10. The mobile computing device of claim 8, wherein the processor is to execute the program code to determine the first confidence value by further:

in response to the position of the mobile computing device having the nearness to the location of the visual code less than the nearness threshold and in response to the orientation of the mobile computing device corresponding to an orientation of a prior actual mobile computing device detection of the visual code within an orientation differential threshold, setting the first confidence to the high value; and in response to the position of the mobile computing device having the nearness to the location of the visual code less than the nearness threshold and in response to the orientation of the mobile computing device not corresponding to an orientation of any prior actual mobile computing device detection of the visual code within the orientation differential threshold, setting the first confidence to the low value.

11. The mobile computing device of claim 8, wherein the processor is to execute the program code to further:

in response to detecting that the mobile computing device is pointing to the visual code, performing a concrete action.

12. The mobile computing device of claim 8, wherein the processor is to execute the program code to detect whether the mobile computing device is pointing to the visual code by:

in response to the first confidence value being greater than a first threshold and the second confidence value being greater than a second threshold, detecting that the mobile computing device is pointing to the visual code.

13. The mobile computing device of claim 8, wherein the processor is to execute the program code to further:

determine a third confidence value corresponding to a likelihood that, from movement and the orientation of the mobile computing device, a user of the mobile computing device is attempting to point the mobile computing device towards any visual code, wherein the processor is to execute the program code to detect whether the mobile computing device is pointing to the visual code by:

in response to the first confidence value being less than a first threshold, the second confidence value being greater than a second threshold, and the third confidence value being greater than a third threshold, detecting that the mobile computing device is pointing to the visual code; and in response to the first confidence value being greater than the first threshold, the second confidence value being less than the second threshold, and the third confidence value being greater than the third threshold, detecting that the mobile computing device is pointing to the visual code.

14. The mobile computing device of claim 8, wherein the processor is to execute the code program to detect whether the mobile computing device is pointing to the visual code by:

in response to the first confidence value being greater than a first threshold and the second confidence value being less than a second threshold but greater than a third threshold, detecting that the mobile computing device is pointing to the visual code.

15. A non-transitory computer-readable data storage medium storing instructions executable by a processor to:

determine a first confidence value corresponding to a likelihood that, from a position and an orientation of a mobile computing device, the mobile computing device is pointing to a visual code;

determining a second confidence value corresponding to a likelihood that, from an image captured by the mobile computing device, the mobile computing device is pointing to the visual code, by:

determining a similarity score of the image captured by the mobile computing device based on comparisons of the image to a plurality of images corresponding to prior actual mobile computing device detections of the visual code; and in response to determining that the similarity score is greater than a first threshold, setting the second confidence value to a very high value;

in response to determining that the similarity score is less than the first threshold and greater than a second threshold lower than the first threshold, setting the second confidence value to a high value less than the very high value; and in response to determining that the similarity score is less than the second threshold, setting the second confidence value to a low value less than the high value; and detecting whether the mobile computing device is pointing to the visual code, based on the first confidence value and the second confidence value.

16. The non-transitory computer-readable data storage medium of claim 15, wherein whether the mobile computing device is pointing to the visual code is detected based on the first confidence value and the second confidence value without actually detecting the visual code within the image captured by the mobile computing device.

17. The non-transitory computer-readable data storage medium of claim 15, wherein the instructions are executable by the processor to further:

in response to detecting that the mobile computing device is pointing to the visual code, perform a concrete action.

18. The non-transitory computer-readable data storage medium of claim 15, wherein the instructions are executable by the processor to detect whether the mobile computing device is pointing to the visual code by:

in response to the first confidence value being greater than a first threshold and the second confidence value being greater than a second threshold, detecting that the mobile computing device is pointing to the visual code.

19. The non-transitory computer-readable data storage medium of claim 15, wherein the instructions are executable by the processor to further:

determine a third confidence value corresponding to a likelihood that, from movement and the orientation of the mobile computing device, a user of the mobile computing device is attempting to point the mobile computing device towards any visual code, wherein the instructions are executable by the processor to detect whether the mobile computing device is pointing to the visual code by:
  in response to the first confidence value being less than a first threshold, the second confidence value being greater than a second threshold, and the third confidence value being greater than a third threshold, detecting that the mobile computing device is pointing to the visual code; and
  in response to the first confidence value being greater than the first threshold, the second confidence value being less than the second threshold, and the third confidence value being greater than the third threshold, detecting that the mobile computing device is pointing to the visual code.

20. The non-transitory computer-readable data storage medium of claim 15, wherein the instructions are executable by the processor to detect whether the mobile computing device is pointing to the visual code by:
  in response to the first confidence value being greater than a first threshold and the second confidence value being less than a second threshold but greater than a third threshold, detecting that the mobile computing device is pointing to the visual code.

* * * * *